June 17, 1969     E. WADE     3,449,810
MANUFACTURE OF CAPACITORS
Filed April 6, 1966
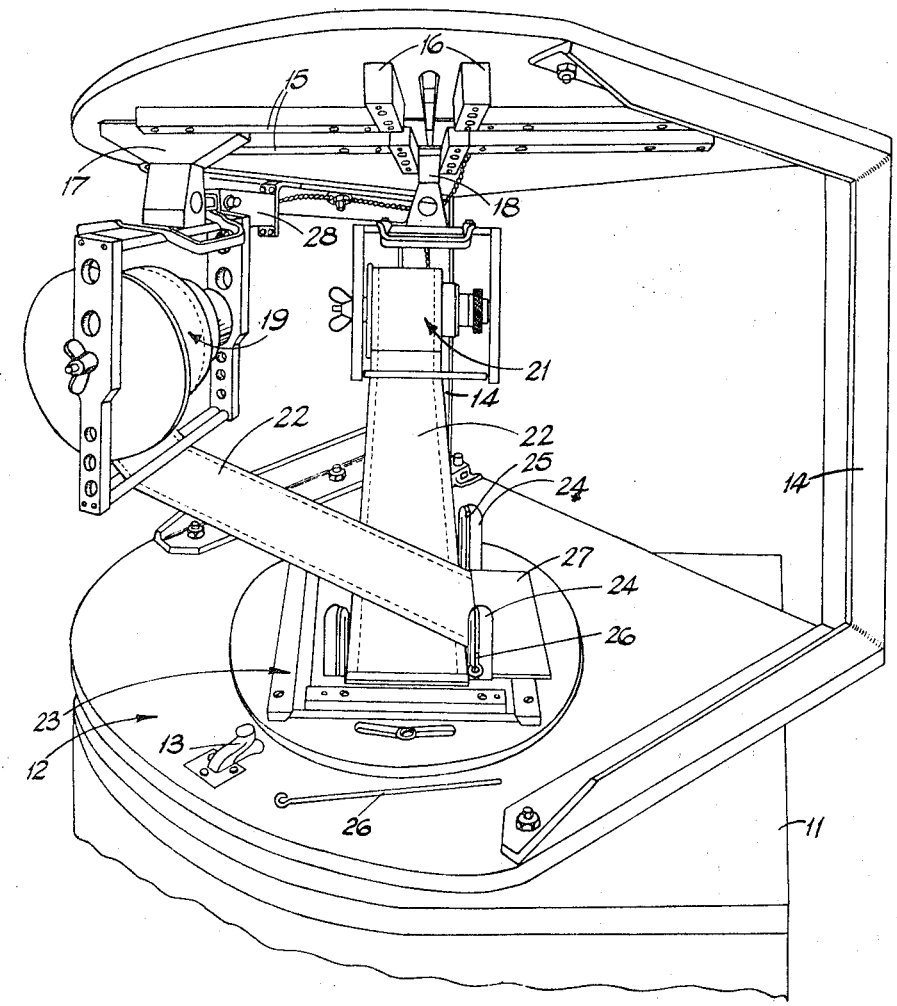

United States Patent Office 3,449,810
Patented June 17, 1969

3,449,810
MANUFACTURE OF CAPACITORS
Eric Wade, Carpenters Park, near Watford, England, assignor to Rotax Limited, London, England
Filed Apr. 6, 1966, Ser. No. 540,726
Int. Cl. H01g *13/00;* B411 *1/32*
U.S. Cl. 29—25.42             5 Claims

ABSTRACT OF THE DISCLOSURE

Apparatus for use in forming a capacitor stack includes a frame on which the stack is formed, and a pair of tracks extending at right angles to one another above the frame. On the tracks are two reels containing the material from which the capacitor is formed, and by moving the reels along their respective tracks in turn and causing the strips to be bent about a former, the stack is formed.

---

It has been proposed to manufacture a capacitor by placing one end of a first strip, comprising a conductor having dielectric on opposite sides thereof, in contact with a similar second strip so that the strips are at right angles, folding the second strip through 180° so that it lies in contact with the first strip, continuing to fold the first strip and second strip in turn through 180° until a stack of the required size is formed, and pressing the stack in the presence of heat.

This invention relates to apparatus for use in forming the stack before the pressing operation.

Apparatus according to the invention comprises in combination a frame on which the stack is to be formed, a pair of tracks extending horizontally at right angles to one another and intersecting at a point vertically above the frame, and a pair of carriages movable along the pair of tracks respectively, the carriage being adapted to support rotatable reels constituting the first and second strips respectively.

The accompanying drawing is a perspective view illustrating one example of the invention.

Referring to the drawing, there is provided a pedestal 11 having a base plate 12 mounted on the top thereof for angular movement relative to the pedestal 11. A catch 13 is provided for locking the plate 12 to the pedestal 11 at either of two extreme angular positions.

Upstanding from the plate 12 are posts 14 which support first and second tracks 15, 16 extending horizontally at right angle to one another. Slidable along the tracks 15, 16 respectively are first and second carriages 17, 18 which carry first and second rotatable reels 19, 21 respectively, each carriage being adjustable to accommodate reels of different size. Each reel 19, 21 consists of a strip 22 comprising a conductor between a pair of dielectric sheets, the conductor conveniently being aluminium and the sheets what is commonly termed "resin coated reconstituted mica," which consists of mica particles formed into a sheet and coated with a resin.

Immediately beneath the intersection of the tracks 15, 16 there is carried by the plate 12 a frame 23 having four posts 24 upstanding therefrom at the corners of a square whose sides are equal to the width of the strips 22.

The capacitor is formed by moving the reels alternately from one end of the appropriate track to the other. The posts 24 are formed with slots 25 for receiving rods 26, and when a strip 22 is to be bent through 180°, a rod is engaged with the appropriate pair of posts, the strip bent by moving the reel along the track, and the rod 26 then removed.

It will be appreciated that the formation of the capacitor is simplified by virtue of the fact that the reels 19, 21 can be moved on the tracks 15, 16 over the frame 23, and the plate 12 can be moved angularly by an operator.

Preferably, a plate 27 is placed on the frame 23 before the capacitor stack is formed to facilitate removal of the capacitor stack from the frame 23.

Preferably, the tracks 15, 16 have associated therewith switches 28, which operate a counter for indicating the number of layers in the capacitor.

Having thus described my invention what I claim as new and desire to secure by Letters Patent is:

1. Apparatus for use in forming a capacitor stack comprising in combination a frame on which the stack is to be formed, support means fixed relative to said frame and carrying first and second tracks extending horizontally at right angles to one another and intersecting at a point vertically above said frame, first and second carriages extending below and movable along the first and second tracks respectively, a first rotatable reel support mounted on said first carriage for rotation about an axis parallel to said second track, a second rotatable reel support mounted on said second carriage for rotation about an axis parallel to said first track, reels on said reel supports, each reel comprising a strip of conductive material having dielectric material on opposite sides thereof, and former means engageable with said frame to define folding edges whereby the strips of conductive material can be bent through 180° in turn about a folding edge to form a capacitor stack.

2. Apparatus as claimed in claim 1 including a base plate carrying the frame and tracks, the base plate being supported for angular movement about a vertical axis.

3. Apparatus as claimed in claim 2 wherein a catch is provided to lock the base plate against angular movement, in either of two extreme angular positions.

4. Apparatus as claimed in claim 1 wherein at least one of the tracks has a switch associated therewith which operates a counter for indicating the number of layers in the stack.

5. Apparatus as claimed in claim 1 in which the frame is provided with four posts arranged at the corners of a square whose sides are substantially equal to the width of the strips, the posts being formed with slots so that rods constituting said former means can be placed between pairs of posts to constitute said folding edges.

References Cited

UNITED STATES PATENTS

| | | | |
|---|---|---|---|
| 709,205 | 9/1902 | Clausen | 29—25.42 XR |
| 2,403,971 | 7/1946 | Fried | 270—39 XR |
| 2,549,386 | 4/1951 | Reigh | 270—61 |
| 2,544,951 | 3/1951 | De Lassus | 270—31 |
| 2,765,517 | 10/1956 | McGraw | 29—25.42 |
| 2,383,225 | 8/1945 | Sorensen et al. | 29—430 |

JOHN F. CAMPBELL, *Primary Examiner.*

R. B. LAZARUS, *Assistant Examiner.*

U.S. Cl. X.R.
29—203; 270—39